United States Patent Office 3,544,505
Patented Dec. 1, 1970

---

3,544,505
LIQUID COATING COMPOSITION
Nobuyoshi Nagata, Nara-shi, and Yoshio Ota, Kyoto, Japan, assignors to Nippon Paint Co., Ltd., Oyodo-ku, Osaka, Japan, a corporation of Japan
No Drawing. Filed Dec. 21, 1967, Ser. No. 692,329
Claims priority, application Japan, Dec. 27, 1966, 42/84,749
Int. Cl. C08g 37/32; C09d 3/76
U.S. Cl. 260—37       10 Claims

ABSTRACT OF THE DISCLOSURE

This invention relates to a liquid coating composition containing as a main vehicle a mixed solution of an aminoaldehyde resin and a copolymer comprising a polymerizable monomer having a hydroxyl group and a tertiary aliphatic group, a polymerizable monomer having a hydroxyl group, and a monomer copolymerizable with said monomers.

---

This invention relates to liquid coating compositions. More particularly, this invention relates to liquid organic coating compositions and method of producing same.

Films formed by baking conventional thermosetting acrylic resin paints have frequently been inferior in mutual adhesion at the over-lap coating or in weather resistance and durability.

The liquid coating composition of the present invention has overcome such drawbacks of the prior art paints and, at the same time, has been made favorable in application properties. Further, the present coating composition is characterized in that it gives a film excellent in weather resistance and durability over a long period as compared with the case of the conventional paints.

A heat-curable liquid coating composition containing as main vehicles a polymeric resin and an aminoaldehyde resin, and a coating obtained by baking said composition.

Recently, surface coating compositions containing as a main vehicle a mixed solution of an aminoaldehyde resin and a copolymer containing at least one member selected from the group consisting of acrylamide, N-methylolacrylamide or 2-hydroxyethyl methacrylate have found a wide scope of applications. Of these, a surface coating composition using an aminoplast resin and a copolymer containing 2-hydroxyethyl methacrylate has been known to be excellent in properties as a general industrial baking paint. That is, when this surface coating composition is applied to a material to be coated and is baked, there is obtained a baked film excellent in hardness, gloss, flexibility, water resistance, stain resistance, weather resistance and durability. Despite such merits, there is "mutual adhesion" as one of the disadvantages occurring in connection with said surface coating composition. "Mutual adhesion" referred to herein means the adhesion between lower film and upper film when a film has been formed on a preformed film, i.e. when overlap-coating has been effected. If this mutual adhesion is bad, the films are peeled off each other with only a slight external impact and, in extreme cases, lose the beautiful appearance. Even when the films undergo no external impact, the composite film is undesirably deteriorated in physical and chemical properties. As measures for improving the above disadvantage, there may be adopted such procedures that the lower film is abraded or sanded to make the surface thereof coarse, or formation conditions of lower and upper films are controlled. However, neither of the above procedures are practical in view of the properties of the film to be formed and of the operations.

The present invention provides a liquid coating composition capable of giving a film improved in mutual adhesion and excellent in weather resistance and durability.

The liquid coating composition of the present invention is characterized in that it comprises a solvent and as substantial film-forming components:

(A) A copolymer consisting of (1) 5~50 parts by weight of a polymerizable monomer having a hydroxyl group and a tertiary aliphatic group, (2) 1~30 parts by weight of a hydroxyl group-containing polymerizable monomer and (3) 50~90 parts by weight of a monomer copolymerizable with said monomer, and (B) An aminoaldehyde resin, the weight ratio of said copolymer to said resin being 65~95:35~5.

The polymerizable monomer having a hydroxyl group and a teritary aliphatic group which is used in the present invention is represented by, for example, the formula:

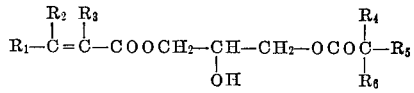

wherein $R_1$ is a hydrogen atom, a $C_1$–$C_4$ alkyl group or carboxyl group; $R_2$ and $R_3$ are individually a hydrogen atom or $C_1$–$C_4$ alkyl group; and $R_4$, $R_5$ and $R_6$ are individually a $C_1$–$C_{22}$ alkyl group. Such polymerizable monomer includes those disclosed in Japanese patent application Nos. 44,418/66 and 63,488/66. That is, said polymerizable monomer can be obtained by reacting, in the presence of an inhibitor if necessary, an $\alpha,\beta$-ethylenic unsaturated acid such as acrylic, methacrylic, crotonic, angelic, tiglic, maleic, fumaric and itaconic acid, with an aliphatic monoglycide compound (typical is "Cardura E," a water-white liquid glycidyl ester produced by the reaction of a practically colorless mixture of saturated highly branched, mainly tertiary monocarboxylic acids having $C_9$, $C_{10}$, and $C_{11}$ chain lengths with epichlorohydrin, a product of Shell Chemical Co.) represented by the formula:

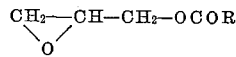

wherein R is a $C_4$–$C_{20}$ teritary fatty acid residue, so that the amount of the epoxy group of the aliphatic monoglycide compound becomes 0.1–2.0 equivalents per equivalent of the carboxyl group of said $\alpha,\beta$-ethylenic unsaturated acid. Another one of the aforesaid polymerizable monomers may be obtained by reacting, in the presence of an inhibitor, a polymerizable monoepoxy compound such as, for example, glycidyl acrylate, glycidyl methacrylate, glycidyl crotonate, butadiene monoepoxide, vinylcyclohexene epoxide, glycidyl oxyethylvinyl sulfide, glycidyl solvate, glycidyl vinylphthalate, glycidyl allyl phthalate or glycidyl allyl maleate, with a neo-acid represented by the formula:

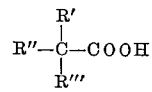

wherein R′, R″ and R‴ are alkyl groups and the total number of carbon atoms of said alkyl groups are 3–25, so that the amount of the carboxyl groups of said neo-acid becomes 0.1–2.0 equivalents per equivalent of the epoxy group of said polymerizable monoepoxy compound. As the inhibitor, quinone, hydroquinone, hydroquinone monomethyl ether or tertiary butyl catechol is used in an amount of ordinarily 50–3,000 p.p.m. based on the monoepoxy compound taking part in the reaction. Suitable as neo-acids include neopentanoic acid, neoheptanoic acid, neodecanoic acid, neotridecanoic acid (these are products of Enjay Chemical Co.), Versatic Acid "9," Versatic Acid "911", a practically colorless mixture of saturated highly branched, mainly tertiary monocarboxylic acids having $C_9$, $C_{10}$, and $C_{11}$ chain lengths, Versatic Acid "SRS 120" (these are products of Shell Chemical Co.), and mixtures thereof.

The reaction of said α,β-ethylenic unsaturated acid or polymerizable monoepoxy compound with, respectively, said aliphatic monoglicide compound or neo-acid may be completed either before, during or after the copolymerization for the preparation of the copolymer to be used in the present invention. If the above reaction is carried out after or during the copolymerization reaction, the use of said inhibitor is not always necessary.

Another component employed in the copolymer of the present invention, i.e. the hydroxyl group-containing polymerizable monomer, includes hydroxyethyl acrylate, hydroxypropyl acrylate, hydroxybutyl acrylate, hydroxyethyl methacrylate, hydroxypropyl methacrylate, hydroxybutyl methacrylate, N-methylol acrylamide, N-methylol methacrylamide, allyl alcohol and methallyl alcohol.

Further, as the monomer copolymerizable with the above-mentioned polymerizable monomer, there may be used any acrylic or methacrylic acid ester in which the alkyl group of alcohol portion has 1–16 carbon atoms, styrene, α-methylstyrene, vinyltoluene, vinyl acetate, acrylonitrile, ethylene, butadiene, acrylamide, methacrylamide, N-ethyl acrylamide, N-methyl methacrylamide, glycidyl acrylate, glycidyl methacrylate, dimethylaminoethyl methacrylate, t-butylaminoethyl methacrylate, acrylic acid, methacrylic acid, itaconic acid, maleic acid, maleic anhydride, fumaric acid and crotonic acid.

The copolymer employed for the production of the liquid coating composition of the present invention is used in admixture with an aminoaldehyde resin. However, in order that the film formed by application and baking of the coating composition is excellent in such physical properties as hardness, flexibility and adhesion to substrate as well as in water resistance and weather resistance, the copolymer should be one prepared from the polymerizable monomers in the aforesaid proportions. Particularly for the improvement in mutual adhesion, it is desirable that the polymerizable monomer having a hydroxyl group and a teritary aliphatic group be used in an amount of 5% or more, preferably from 10 to 40%, by weight based on the total monomer.

The copolymer of the present invention may be prepared according to any processes of bulk, solution or granular copolymerization. Desirably, the reaction is accomplished in a solution state at 70°–150° C. in the presence of a polymerization catalyst such as, for example, benzoyl peroxide, azobisisobutyronitrile, ditertiary butyl peroxide or cumene hydroperoxide.

As the aminoaldehyde resin employed in the present liquid coating composition, there may be used any of urea-aldehyde resin, melamine-aldehyde resin, benzoguanamine-aldehyde resin, dicyandiamide-aldehyde resin and resinous condensates prepared by the reaction of triazine derivatives with aldehydes. As the aldehydes to be reacted with amino compounds in order to prepare said resinous materials, such aldehydes as formaldehyde, paraformaldehyde, acetaldehyde and benzaldehyde are usable. Further, alcohols are usually employed in the process of the preparation of said aminoaldehyde resins of present invention to become alkylated aminoaldehyde resins. Said alcohols are methyl alcohol, ethyl alcohol, propyl alcohol, butyl alcohol, 2-ethylbutanol, 2-ethylhexanol, benzyl alcohol and lauryl alcohol. Ordinarily, however, alcohols having 1–4 carbon atoms are preferable.

As to the mixing proportions of the thus obtained copolymer and aminoaldehyde resin which are substantial film-forming components of the present liquid coating composition, it is preferable, in view of the proportions of reactive functional groups and of the results of actual efficiency test, that 65–95 parts by weight of copolymer be mixed with 5–35 parts by weight of aminoaldehyde resin. The compatibility of the present copolymers with aminoaldehyde resins is markedly excellent, in general. Further, the reason why the liquid coating composition of the present invention is excellent in mutual adhesion is considered ascribable to the steric hindrance of molecules of the polymerizable monomer having a hydroxyl group and a tertiary aliphatic group which is contained as a segmer in the copolymer of the present invention, and it is considered that, despite the above, sufficient cross-linking is effected within such a scope as not to injure the mutual adhesion.

The coating compositions of the present invention may contain a wide variety of common additives such as, for example, solvents, plasticizers, pigments, stabilizers, fluidity controlling agents, ultraviolet-ray absorbers and the like. The solvents to be employed in the present coating composition may be used at the time of preparation of the copolymers and at the time of production and application of the coating compositions. Examples of the solvents are toluene, xylene, methyl ethyl ketone, methyl isobutyl ketone, acetone, ethyl acetate, butyl acetate, methanol, ethanol, butanol and ethylene glycol monoethyl ether. Alternatively, there may be used one or more of other aliphatic, alicyclic and aromatic hydrocarbons, esters, ethers, ketones and alcohols, and those of the kind used for alkyd, melamine-formaldehyde resin system paints. Examples of the plasticizers are phthalic acid esters, fatty acid epoxy esters, polyesters and flexible polymers particularly prepared for acrylic resins, etc.

Examples of the pigments usable in the present coating compositions are metal oxides, hydroxides, chromates, silicates, sulfides, sulfates, carbonates, organic dyes and lakes, and metallic flake pigments and pearl foil pigments. The amounts of pigments employed in the present coating compositions are variable depending on the kind of pigments, such as metallic oxides, hydroxides, chromates, silicates, sulfides, sulfates, carbonates, organic dyes, lakes, and metallic flake pigments, as is well known to those skilled in the art of this field. They may be used over such a wide range of from 1 to 200 parts by weight per 100 parts by weight of film-forming materials. For example, a metallic finishing formula of acrylic resin paint for automobiles is prepared by adding 1–5 parts by weight of an aluminum flake pigment and 1–5 parts by weight of a colored dispersed pigment paste to 100 parts by weight of the copolymer, while a formula of white enamel paint for domestic electric apparatus is prepared by adding 80–120 parts by weight of titanium dioxide to 100 parts by weight of the copolymer.

By the use of stabilizers, advantageous effects can frequently be expected, and the copolymers or copolymer-containing film-forming components sometimes show a high acid number. Acid has a catalyst action to promote the reaction of the present coating composition, and when the composition shows a high acid number, viscosity increase occurs with passing the time even at room temperature. In such a case, it is desirable to add a volatile basic substance as stabilizers for the reaction. Therefore, either before, during or after the preparation of the present copolymer or during the production of the present coating composition, triethylamine, trimethylamine, tripropylamine, monoethyldiethylamine or triethanolamine, for example, may be added in an amount of 3% by weight or less based on the total film-forming component.

The present liquid coating composition may further be incorporated with at most about 50% by weight, based on the total weight of said copolymer and aminoaldehyde resin, of other film-forming material such as, for example, polyvinylchloride resin and its derivatives, epoxy resin, alkyd resin, oil-free alkyd resin, polyester resin, phenol resin, polyvinylbutyral resin or silicone resin.

The components for use in the present coating composition can be mixed together to a finished product according to any desired process for the production of conventional alkyd-aminoaldehyde resin paints. It is, however, preferable that the present coating composition be produced in the following manner:

A pigment and a suitable amount of a solvent are blended with at least a part of the copolymer to form a pasty or somewhat solid pigment paste. Alternatively, at least a part of the copolymer containing a metal flake pigment, a dispersed pigment and a solvent which has been prepared so as to be easily dispersible in an organic solvent, is subjected to a high speed dissolver to form a dispersion. Subsequently, the resulting paste or dispersion is charged with an aminoaldehyde resin and, if necessary, with residual copolymer and other additives, and the mixture is diluted with one or more of the aforesaid solvents to a given viscosity, e.g. to a solid content of 10–60% by weight based on the total weight of non-volatile matter.

The liquid coating composition of the present invention can be applied according to a known coating application such as, for example, flow coating, dip coating, spray coating, roller coating or brush coating, and is desirably baked at an elevated temperature, e.g. about 100°–200° C., for 1–100 minutes. The present coating composition may be applied directly onto a bare metal, but is desirably applied onto a conventional undercoat paint, preferably an undercoat paint containing and epoxy-modified copolymer resin as a main vehicle.

The liquid coating compositions of the present invention are used for coating steel and are particularly suitable as finishing paints for steel-made automobile bodies and electric appliances for domestic use. They are also usable as finishing paints for glass, ceramics, plastics, wood, and aluminum, copper, magnesium and alloys thereof. The present coating compositions are characterized in that they are improved in mutual adhesion and are excellent in weather resistance and durability when formed into films. Further, the films of the present coating compositions are prominent in gloss in an spray coating without polishing and in gloss retention.

The following examples illustrate the present invention in which all the proportions and percentages are by weight unless otherwise specified.

EXAMPLE 1

(1) Preparation of copolymer solution (a) "Cardura E"-methacrylic acid reaction product.— 300 parts of "Cardura E" (a product of Shell Chemical Co.), 155 parts of methacrylic acid, 0.08 part of hydroquinone and 50 parts of ethyl acetate were charged into a reactor. The reaction mixture was allowed to stand with stirring at about 100°–110° C. for 6 hours to complete the reaction. According to a design of a formula methacrylic acid was added in excess of 50% equivalent based on Cardura E. The acid number of the product obtained after reaction was 67.2.

(b) Copolymer solution—Into a 1 l. flask were charged the following materials:

| | Parts |
|---|---|
| 2-hydroxyethyl methacrylate | 30 |
| Methacrylic acid | 2.6 |
| Styrene | 100 |
| Ethyl acrylate | 100 |
| Reaction product obtained in (a) | 75 |
| Butanol | 60 |
| Xylene | 112 |

The mixture was gradually elevated in temperature to about 100°–110° C. To the mixture, a mixed solution comprising 1.8 parts of azobisisobutyronitrile and 60 parts of toluene was uniformly added dropwise over a period of 90 minutes with stirring while maintaining the mixture at said temperature. After dropwise addition, the mixture was allowed to stand in said state for additional 90 minutes. Subsequently, a mixed solution comprising 1.8 parts of azobisisobutyronitrile and 60 parts of toluene was added dropwise in the same manner as above. After the dropwise addition, stirring was continued for 2 hours to complete the reaction. The resulting copolymer solution was a colorless, transparent, viscous solution having a non-volatile content of 48.5%, a viscosity of X (Gardner bubble viscosimeter) and an acid number of 12.0.

(2) Preparation of liquid coating composition

The materials shown below were homogeneously mixed and dispersed together by means of a high speed disperser to prepare an enamel.

| | Parts |
|---|---|
| Copolymer solution obtained in (b) | 80 |
| "Nikalac BL–60" (non-volatile matter: 60%)[1] | 16.7 |
| "Ishihara R–560 Titanium White"[2] | 50 |
| Silicone liquid[3] | 0.7 |
| Toluene | 3.3 |

[1] Trade name for methanol-modified benzoguanamine resin produced by Nippon Carbide K. K.
[2] Trade name for rutile type titanium oxide produced by Ishihara Sangyo K. K.
[3] A 10% xylene solution of "R–12 Resin," a silicone resin produced by Union Carbide Co., U.S.A.

Evaluation of liquid coating composition.—White enamel obtained as the above-mentioned liquid composition was suitably diluted with a 1:1 mixed solvent of toluene and xylene and was applied by spray coating (dry film thickness by one time application was controlled to $20\pm3\mu$) onto a 0.8 mm. thick steel plate treated with a common anti-corrosive liquid (Granodine #164, a productof Nippon Paint K. K.). After allowing to stand for about 15 minutes, the enamel was baked at a given temperature for a given period. Subsequently, overlap-coating was effected in the same manner as above without applying any physical or chemical treatment onto the film surface. The thus obtained film-coated plate was subjected to the following tests:

Gloss.—The film was subjected to Murakami's glossmeter and the gloss of the film was represented by its reflectivity at 60° C.

Impact.—The film was subjected to Du Pont's impact tester and when the film could withstand the conditions of 1/2"φ, 500 g. and 30 cm., it was evaluated as being passed."

Erichsen value.—The film was subjected to Erichsen testing machine, and the extrusion degree of the film until it had been broken was represented by mm.

Mutual adhesion.—Using a cross cutter, 100 squares of 1 mm. size were formed on the film. A scotch tape was adhered onto said squares and was quickly peeled off, and the number of squares which did not come off was deemed as the mutual adhesion. The adhesion between the undercoat and the steel plate was excellent and hence was out of question.

Boiling water resistance.—The coated surface was vertically immersed in boiling water for a given period of time, and was then taken out to investigate whether or not there was any change on the film surface.

Stain resistance.—Blue and red magic inks (products of Uchida Yoko) and rouge (Rouge #2 produced by Kissme Co.) were applied onto the film surface. After allowing the film to stand at 20° C. for 1 day, the magic inks were wiped off with a butanol-impregnated cloth and the rouge with a cloth, and the degrees of residual colors were represented by the figures of from 0 to 5, evaluating that 0 was non-coloration and 5 was marked coloration.

The results of the above tests were as set forth in Table 1.

As reference examples, there are also shown in Table 1 the results of tests on the prior art paints prepared by using no such polymerizable monomer having a hydroxyl group and a tertiary aliphatic group as used in the copolymer of the present invention, provided that the copolymers employed in the prior art paints were prepared in entirely the same manner as in the case of aforesaid (b).

|  | Reference examples— | | |
|---|---|---|---|
|  | 1 | 2 | 3 |
| 2-hydroxyethyl methacrylate | 30 | 18 | 45 |
| Methacrylic acid | 12 | 12 | 12 |
| Ethyl acrylate | 129 | 135 | 180 |
| Styrene | 129 | 135 | 63 |
| Butanol | 60 | 60 | 60 |
| Xylene | 120 | 120 | 120 |

To individual mixtures comprising the above materials a polymerization catalyst solution comprising 1.8 parts of azobisisobutyronitrile and 60 parts of toluene was added 2 times in the aforesaid manner to obtain copolymers.

The preparation of paints also was effected in the same manner as in the case of the present coating composition, according to the following blending:

|  | Parts |
|---|---|
| Above copolymer | 80 |
| Nikalac BL-60 (non-volatile: 60%) | 16.7 |
| "Ishihara-560 Titanium white" | 50 |
| Silicon liquid | 0.7 |
| Toluene | 3.3 |

TABLE 1

|  | Paint | | | | | |
|---|---|---|---|---|---|---|
|  | Present coating composition | | Reference Example 1 | Reference Example 2 | Reference Example 3 | |
| Baking conditions | 150° C. 20 min. | 170° C. 20 min. | 160° C. 20 min. | 160° C. 20 min. | 150° C. 20 min. | 170° C. 20 min. |
| Test item: |  |  |  |  |  |  |
| Gloss | 91.8 | 90.3 | 93.8 | 95 | 70 | 72 |
| Impact | (1) | (1) | (1) | (2) | (2) | (2) |
| Erichsen value | 1.0 | 2.0 | 1.5 | 2.7 | 2.9 | 2.8 |
| Mutual adhesion | 100/100 | 100/100 | 2/100 | 20/100 | 2/100 | 0/100 |
| Boiling water resistance | Unchanged | | (3) | (4) | Unchanged | |
| Stain resistance: |  |  |  |  |  |  |
| Magic ink, blue | 0 | 0 | 0 | 0 | 0 | 0 |
| Magic ink, red | 0 | 0 | 0 | 0 | 0 | 0 |
| Rouge | 0 | 0 | 0.3 | 0.2 | 0 | 0 |

[1] Passed.
[2] Not passed.
[3] Slightly swelled.
[4] Considerably swelled.

EXAMPLE 2

In substantially the same manner as in Example 1, copolymer solutions were prepared according to the blendings shown in the following table:

TABLE 2

| Copolymer solution No. | 1 | 2 | 3 | 4 | 5 | 6 | 7 | 8 | 9 | 10 |
|---|---|---|---|---|---|---|---|---|---|---|
| Blended amount: |  |  |  |  |  |  |  |  |  |  |
| 2-hydroxyethyl methacrylate | 25 | 25 | 37.5 | 37.5 | 50 | 12.5 | 30 | 37.5 | 50 | 20 |
| Reaction product of Example 1 | 63.25 | 63.25 | 41.7 | 83.3 | 55.7 | 83.4 | 66.9 | [1] 55.7 | [1] 55.7 | 22.2 |
| Methacrylic acid | 2.12 | 2.12 |  |  |  |  |  |  |  |  |
| Methyl methacrylate | 125 | 83.3 |  |  |  |  |  | 50 | 75 | 155 |
| Styrene |  |  | 125 | 95 | 75 | 75 | 80 | 75 |  | 35 |
| Ethyl acrylate |  | 83.3 |  |  | 75 | 87.6 | 80 |  | 25 |  |
| Butyl acrylate | 41.4 |  |  | 42.6 |  |  |  |  | 50 | 20 |
| Lauryl methacrylate |  |  | 50 |  |  |  |  |  |  |  |
| 2-ethylhexyl acrylate |  |  |  |  |  |  |  | 37.5 |  |  |
| Butanol | 50 | 50 | 50 | 50 | 50 | 50 | 50 | 50 | 50 | 50 |
| Xylene | 100 | 100 | 50 | 66.8 | 69.5 | 66.9 | 68.4 | 69.4 | 100 | 72.5 |
| Ethyl acetate | 43.8 | 43.8 | 45.9 | 25 | 25 | 25 | 25 | 25 | 44.4 | 25 |
| Dodecyl mercaptan | 3 | 2.5 |  |  |  |  |  |  | 2.5 | 3 |
| Dropwise addition, reaction temp. (° C.) | 100 | 100 | 108 | 108 | 105 | 103 | 102 | 108 | 105 | 100 |
| Azobisisobutyronitrile | 2.5 | 3 | 1.75 | 1.75 | 1.75 | 1.75 | 1.75 | 1.75 | 3 | 2 |
| Toluene | 50 | 50 | 50 | 50 | 50 | 50 | 50 | 50 | 50 | 50 |
| Dropwise addition time (hr.) | 2.5 | 2.5 | 1.5 | 1.5 | 1.5 | 1.5 | 1.5 | 1.5 | 2.5 | 2 |
| Reaction time after dropwise addition | 2.5 | 2.5 | 1.5 | 1.5 | 1.5 | 1.5 | 1.5 | 1.5 | 2.5 | 2.5 |
| Azobisisobutyronitrile |  |  | 1.75 | 1.75 | 1.75 | 1.75 | 1.75 | 1.75 |  | 1.75 |
| Toluene |  |  | 50 | 50 | 50 | 50 | 50 | 50 |  | 50 |
| Dropwise addition time |  |  | 1.5 | 1.5 | 1.5 | 1.5 | 1.5 | 1.5 |  | 1.5 |
| Reaction time after dropwise addition |  |  | 1.5 | 1.5 | 1.5 | 1.5 | 1.5 | 1.5 |  | 1.5 |
| Reaction product: |  |  |  |  |  |  |  |  |  |  |
| Non-volatile | 52.6 | 50.2 | 46.9 | 48.6 | 48.9 | 48.1 | 48.5 | 49.5 | 49.7 | 49.5 |
| Viscosity | Y-Z | T | P | V-W | V-W | R | V | $Z_1$ | $Z_3$ | Z |

[1] There were used, in place of the reaction product of Example 1—(a), polymerizable monomers having hydroxyl groups and tertiary aliphatic groups which were obtained by the reaction of glycidyl methacrylate with neoheptanoic acid and neotridecanoic acid, respectively, which are products of Enjay Chemical Co. They were obtained individually by reacting the materials shown below in a reactor at a given temperature for a given period of time. Kind of reaction products:

|  | Parts | |
|---|---|---|
|  | Note 4 | Note 5 |
| Neoheptanoic Acid | 130 |  |
| Neotridecanoic Acid |  | 154 |
| Glycidyl methacrylate | 213 | 99.4 |
| Ethyl acetate | 38.1 |  |
| Ethylene glycol monoethyl acetate |  | 28 |
| Hydroquinone | 0.213 |  |
| Hydroquinone monomethyl ether |  | 0.1 |
| Triethylamine |  | 5.0 |
| Reaction temperature (° C.) | 110–120 | 80–90 |
| Reaction time (hr.) | 7.5 | 5 |
| Acid number of reaction product: |  |  |
| (Before reaction) | 149 | 138 |
| After reaction | 8.9 | 9.5 |
| (Neo Acid/glycidyl methacrylate, mol) | 1/1.5 | 1/1 |

Preparation of liquid coating compositions.—In the same manner as in Example 1, liquid coating compositions were prepared according to the formulas shown below using the above-mentioned copolymer solutions.

(1) Formulas of white enamels:

| | | |
|---|---|---|
| Above copolymer solution Nos. 1-7 | 80 | |
| Above copolymer solution Nos. 8-9 | | 90 |
| Super-Beckamine G-821 (Non-volatile: 50%) [1] | 20 | 10 |
| Ishihara R-820 titanium dioxide [2] | 20 | 20 |
| Silicon liquid | 0.7 | 0.7 |

(2) Formulas of metallic paints:

| | | |
|---|---|---|
| Above copolymer solution Nos. 1-7 | 80 | |
| Above copolymer solution Nos. 8-9 | | 90 |
| Super-Beckamine G-821 | 20 | 10 |
| Microlith 4GT Blue [3] | 1.5 | 1.5 |
| Alpaste 1109 A [4] | 2 | 2 |
| Silicon liquid | 0.5 | 0.5 |

[1] Butylated melamine resin produced by Dainippon Ink K. K.
[2] Rutile type titanium dioxide produced by Ishihara Sangyo K. K.
[3] Super dispersible pigment paste produced by Ciba Co., Swiss.
[4] Aluminum flake-like pigment paste produced by Toyo Aluminum K. K.

Evaluation of coating compositions.—Onto a 0.8 mm thick steel plate treated, like in Example 1, with an anti-corrosive liquid (Granodine #45AT, a product of Nippon Paint K. K.), an undercoat paint was applied according to an ordinary procedure to coat the plate surface. The undercoat paint was prepared by kneading an epoxy-modified acrylic resin as a vehicle with ordinary anti-corrosive pigment and filler so that the pigment volume concentration (volume ratio of pigment to total paint solid) became about 35%. The thus prepared undercoat paint was diluted with a suitable amount of a thinner, was applied onto said steel sheet by spray coating to a dry film thickness of 25–35μ, was dried by heating at 140° C. for 30 minutes, was water-polished using a fine water-proof sandpaper, and was then thoroughly dried.

Thereafter, the aforesaid coating compositions were individually applied by spray coating to a dry film thickness of 25–35μ and were baked at 140° C. for 30 minutes to dryness, and this operation was repeated once more.

The resulting films were subjected to efficiency tests in the same manner as in Example 1 to obtain the results as set forth in Tables 2 and 3.

Provided that the adhesion between the steel plate and the undercoat was quite ideal and perfect, and therefore the mutual adhesion test was effected with respect to the adhesion between the undercoat and second coat, the film formed thereon. The pencil hardness test was effected in such a manner that hardness-measuring pencils "Mitsubishi Uni-Pencil" produced by Mitsubishi Empitsu K. K. were used to scratch the surface of the film and the value of pencil hardness was represented by the maximum hardness of a pencil which formed no scratch on the film surface any more. The impact test was effected in such a manner that the film was subjected to Du Pont's impact tester under the conditions of 1.2″ $\phi$ and 300 g., and the height of the film at which no breakage had occurred was represented by cm. The gasoline resistance was measured in such a manner that the coated surface was vertically immersed for 24 hours in a commercially available leaded gasoline and was then taken out to observe the appearance thereof. Further, the coated surface thus immersed was dried at room temperature for 4 hours, and the hardness thereof was represented by a pencil hardness. Finally, the the hot water resistance was measured in such a manner that the coated surface was vertically immersed for 10 days in hot water maintained at 40° C. and was then taken out to observe whether the appearance had changed or not.

TABLE 2. WHITE ENAMEL FINISHES

| Kind | 1 | 2 | 3 | 4 | 5 | 6 | 7 | 8 | 9 | 10 |
|---|---|---|---|---|---|---|---|---|---|---|
| Test item: | | | | | | | | | | |
| Gloss | 89.4 | 87.0 | 97.0 | 91.8 | 91.0 | 90.0 | 91.8 | 96.5 | 92.7 | 90.5 |
| Mutual adhesion | 100/100 | 100/100 | 100/100 | 100/100 | 100/100 | 100/100 | 100/100 | 100/100 | 100/100 | 100/100 |
| Pencil hardness | 3H | 2H | H | H | H | H | H | H | B | 3H |
| Erichsen value (mm.) | 1.3 | 6.1 | 6.0 | 3.6 | 6.0 | 6.7 | 5.5 | 0.7 | 7.5 | 1.2 |
| Impact test (cm.) | 30 | 30 | 30 | 30 | 40 | 50 | 40 | 20 | 30 | 20 |
| Gasoline resistance,[1] appearance | ◎ | ○ | ○ | ○ | ○ | ○ | ○ | ○ | △ | ◎ |
| Pencil hardness after 4 hours | H | 2B | HB | HB | HB | 2B | 2B | 2B | 3B | H |
| Hot water resistance [2] | ○ | △ | ◎ | ○ | △ | △ | △ | △ | ○ | ○ |

[1] ◎=Unchanged; △=Somewhat softened; ○=Slightly softened; X=Dissolved.
[2] ◎=Unchanged; △=Somewhat thinned; ○=Slightly coarsened; X=Somewhat swelled.

TABLE 3. METALLIC FINISHES

| Kind | 1 | 2 | 3 | 4 | 5 | 6 | 7 | 8 | 9 | 10 |
|---|---|---|---|---|---|---|---|---|---|---|
| Test item: | | | | | | | | | | |
| Gloss | 87.1 | 89.6 | 94.6 | 93.2 | 94.8 | 93.0 | 94.0 | 97.0 | 93.0 | 92.0 |
| Mutual adhesion | 100/100 | 100/100 | 100/100 | 100/100 | 100/100 | 100/100 | 100/100 | 100/100 | 100/100 | 100/100 |
| Pencil hardness | 2H | H | H | H | H | H | H | H | HB | 2H |
| Erichsen value (mm.) | 0.7 | 5.7 | 5.5 | 1.0 | 3.0 | 6.0 | 5.5 | 0.7 | 8.2 | 0.7 |
| Impact test (cm.) | 30 | 30 | 30 | 40 | 40 | 40 | 30 | 40 | 30 | 30 |
| Gasoline resistance,[1] appearance | ◎ | ○ | ○ | ○ | ○ | ○ | ○ | ○ | △ | ◎ |
| Pencil hardness after 4 hours | F | 3B | 2B | 2B | B | 3B | 2B | 3B | 4B | B |
| Hot water resistance [2] | ◎ | ○ | ◎ | ◎ | ○ | ○ | ◎ | ○ | △ | ○ |

[1] ◎=Unchanged; △=Somewhat softened; ○=Slightly softened; X=Dissolved.
[2] ◎=Unchanged; △=Somewhat thinned; ○=Slightly coarsened; X=Somewhat swelled.

We claim:
1. A liquid coating composition which comprises a solvent and, has substantial film-forming components, (A) a copolymer consisting of (1) 5 to 50 parts by weight of a polymerizable monomer having a hydroxyl group and a tertiary aliphatic group and represented by the formula:

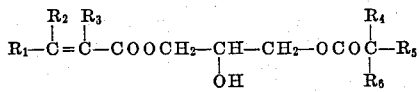

wherein $R_1$ is selected from a hydrogen atom, a $C_1$-$C_4$ alkyl group and a carboxyl group; $R_2$ and $R_3$ are individually selected from a hydrogen atom and a $C_1$-$C_4$ alkyl group; and $R_4$, $R_5$ and $R_6$ are individually a $C_1$-$C_{22}$ alkyl group, (2) 1 to 30 parts by weight of a polymerizable monomer having a hydroxyl group, (3) 50 to 90 parts by weight of a monomer copolymerizable with said monomers; and (B) an amino aldehyde resin, the weight ratio of said copolymer to said resin being 65~95 to 35~5.

2. A liquid coating composition according to claim 1 wherein the polymerizable monomer having a hydroxyl group and a tertiary aliphatic group is said monomer prepared by reacting a water-white liquid glycidyl ester produced by the reaction of a practically colorless mixture of, saturated highly branched, mainly tertiary monocarboxylic acids have $C_9$, $C_{10}$ $C_{11}$ chain lengths and epichlorohydrin with at least one member selected from the group consisting of methacrylic acid, acrylic and crotonic acid.

3. A liquid coating composition according to claim 1, wherein the polymerizable monomer having a hydroxyl group is at least one member selected from the group consisting of hydroxyethyl methacrylate, hydroxypropyl methacrylate and hydroxybutyl methacrylate.

4. A liquid coating composition according to claim 1, wherein at least 58% by weight of the total copolymerizable monomer is styrene.

5. A liquid coating composition according to claim 1, wherein at least 50% by weight of the total copolymerizable monomer is methyl methacrylate.

6. A liquid coating composition according to claim 1, wherein at least 50% by weight of the total copolymerizable monomer is both styrene and methyl methacrylate.

7. A liquid coating composition which comprises a solvent and, as substantial film-forming components, 100 parts by weight of a mixture of the copolymer (A) and the aminoaldehyde resin (B) of claim 1, the weight ratio of said copolymer to said resin being 65~95 to 35~5, and (C) up to 50 parts by weight, based on 100 parts of mixture of total solids content comprising (A) and (B), of at least one member selected from the group consisting of vinyl, epoxy, alkyd, oil-free alkyd, polyester, phenol, polyvinyl butyral and silicon resins.

8. A liquid coating composition according to claim 1 wherein 1 to 200 parts by weight of a pigment is uniformly dispersed per 100 parts by weight of the total film-forming component.

9. A liquid coating composition according to claim 1 wherein 1 to 5 parts by weight of an aluminum flake pigment and 1 to 5 parts by weight of a colored dispersed pigment paste are uniformly dispersed per 100 parts by weight of the total film-forming component.

10. A liquid coating composition according to claim 1 wherein 80 to 120 parts by weight of titanium dioxide is uniformly dispersed per 100 parts by weight of the total film-forming component.

References Cited

UNITED STATES PATENTS

| | | | |
|---|---|---|---|
| 3,262,838 | 7/1966 | Vieth et al. | 260—851 |
| 3,183,282 | 5/1965 | Hurwitz | 260—851 |
| 3,090,762 | 5/1963 | Maeder et al. | 260—851 |
| 3,082,184 | 3/1963 | Falgiatore et al. | 260—851 |
| 3,387,022 | 6/1968 | Hagemeyer et al. | 260—89.5 |

MORRIS LIEBMAN, Primary Examiner

S. M. PERSON, Assistant Examiner

U.S. Cl. X.R.

260—38, 39, 40, 41, 89.5, 851